United States Patent [19]
Kessler et al.

[11] Patent Number: 5,907,360
[45] Date of Patent: *May 25, 1999

[54] CODER/DECODER FOR TELEVISION IMAGE SUB-BAND COMPATIBLE CODING, AND ITS APPLICATION TO HIERARCHICAL MOTION CODING BY TREE STRUCTURES

[75] Inventors: Damien Kessler, Rennes, France; Bruce Devlin, Sutton, United Kingdom; Fadila Boucherok, Rennes, France

[73] Assignee: Thomson-CSF, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/513,860
[22] PCT Filed: Mar. 4, 1994
[86] PCT No.: PCT/FR94/00239
  § 371 Date: Jun. 5, 1996
  § 102(e) Date: Jun. 5, 1996
[87] PCT Pub. No.: WO94/22267
  PCT Pub. Date: Sep. 29, 1994

[30] Foreign Application Priority Data
Mar. 16, 1993 [FR] France .................. 93 03010

[51] Int. Cl.⁶ .................................................. H04N 7/32
[52] U.S. Cl. ........................................... 348/398; 348/413
[58] Field of Search .................. 348/398, 413, 348/415, 419; 382/236, 240

[56] References Cited

U.S. PATENT DOCUMENTS

| | | | |
|---|---|---|---|
| 4,817,182 | 3/1989 | Adelson et al. | 382/248 |
| 4,918,524 | 4/1990 | Ansari et al. | 348/398 |
| 4,969,040 | 11/1990 | Gharavi | 348/398 |
| 5,097,331 | 3/1992 | Chen et al. | 348/398 |
| 5,278,915 | 1/1994 | Chupeau et al. | 382/236 |
| 5,420,891 | 5/1995 | Akansu | 375/350 |
| 5,446,495 | 8/1995 | Tourtier et al. | 348/398 |
| 5,633,684 | 5/1997 | Teranishi | 348/398 |

OTHER PUBLICATIONS

J. Mau et al, "Sub–band source coding for HDTV", EBU Technical Review, Spring 1992, pp. 34–44.

*Primary Examiner*—Bryan Tung
*Attorney, Agent, or Firm*—Oblon, Spivak, McClelland, Maier & Neustadt, P.C.

[57] ABSTRACT

A coder/decoder including a device for constructing from the preceding decoded image and from the current source image two pyramids of images of unlike resolution. Each pyramid contains the same number of images ordered identically according to their resolution. Each image corresponds to a level of resolution which is half as large in the horizontal and vertical directions of the image as a preceding level of resolution. Each pyramid is applied to a first and second serial input of the hierarchical motion estimator which outputs a motion vector having a magnitude which is proportional to the estimated motion between the two pyramids.

12 Claims, 2 Drawing Sheets

CODER/DECODER FOR TELEVISION IMAGE SUB-BAND COMPATIBLE CODING, AND ITS APPLICATION TO HIERARCHICAL MOTION CODING BY TREE STRUCTURES

BACKGROUND OF THE INVENTION

Field of the Invention

The present invention relates to a coder/decoder for sub-band compatible coding of television images and its application to hierarchical motion coding by tree structures.

It applies to digital transmission systems and especially to the transmission of digital image sequences.

DISCUSSION OF THE BACKGROUND

Recent technological progress with regard to digital transmission, together with the development of broadband digital networks, have given the role of digital compression a strategic position. Whereas the bit rates allocated for data transmission ceaselessly diminish, the requirement in relation to the quality of coding grows. Thus, in respect of the transmission of digital image sequences, the algorithms developed require the use of ever more enhanced and complex techniques, usually based on exploiting temporal redundancy together with motion estimation. This is the case for example with bidirectional coding, with "frame skip", an expression defining a technique of image jumping, or with techniques of temporal interpolation.

However, these techniques entail the appearance of new constraints as regards motion estimation. Bidirectional coding requires the ability to estimate motions of large magnitude, especially if the images processed are in the High Definition (HD) format. "Frame skip" and temporal interpolation demand accurate vector fields which are as alike the physical field as possible. Moreover, since the motion information to be transmitted becomes substantial, it is essential to reduce the cost of coding the motion field as much as possible: the most effective means of doing this is to make it as homogeneous as possible. Accuracy, homogeneity, large magnitudes and fitness to the physical field are the main characteristics to be taken into account by the motion estimator.

The majority of known image coders/decoders use discrete cosine transform coding, known by the abbreviation DCT, operating in intra and inter mode together with a motion estimation technique of "block matching" type, an expression denoting a technique according to which the image is partitioned into blocks, one motion vector per block being determined by a correlation computation, this technique making it possible to obtain motion vectors computed in terms of integer numbers of pixels, or more rarely of "pel-recursive" type, where pel is the abbreviation for pixel, developed notably in "Motion estimation and compensation for image sequence coding", published in "Image Communication 4, 1992, pp 161–174". Pel-recursive does not enable sufficient accuracy to be achieved at the level of the motion of contours and is still too sensitive to noise.

A more widespread technique which gives better results in terms of reducing the prediction error is the technique known by the expression "block matching full search". This technique does not however allow estimation of motions of large magnitude: the increase in the search window is rapidly limited by considerations of hardware implementation. Moreover, the "full search" technique does not take into account the spatial correlation between the vectors arising from adjacent blocks, this often being manifested as a noisy field which is remote from the true motion. Raising the size of the search window can only accentuate the inhomogeneity of the estimated field and, consequently, its non-negligible coding cost at low bit rate. The "full search" technique is therefore no longer suited to the new constraints.

More complex but faster "block matching" techniques permitting more substantial vector excursions have been developed in several articles and notably in a publication by Q. Wang and R. J. Clarke entitled "Motion estimation and compensation for image sequence coding" published in "Image Communication 4, 1992, pp. 161–174" and in a publication by L. Lee, J. WANG, J. Lee and J. Shie entitled "Dynamic Search Window Adjustment and Interlaced Search for Block S Hatching Algorithm" published in "International Workshop on HDTV'93, Proceedings, vol.2, Nov. 1992, Kawasaki".

The aim of these techniques is to minimize the number of positions tested per block. The benefit of these methods lies in avoiding an exhaustive search. However, they do not afford greater consistency of the motion field and, on the contrary, increase the possibilities of the motion estimator diverging. The techniques of hierarchical estimation, however, do enable the constraints defined earlier regarding the coding of the motion field to be satisfied.

One known type of codec, the abbreviation for coder/decoder, which uses these coding and estimation techniques, includes a compatible structure having two prediction loops so as to avoid drift between the full resolution coder of the first loop, called the HDTV coder, the abbreviation for High Definition TeleVision, and the quarter resolution decoder of the second loop, called the TV decoder, the abbreviation for TeleVision understood to be of "standard" type. Such a structure is developed in a publication entitled "draft Specification of a TV/EDTV Compatible Coding Scheme", published in "Document CHTT/2-SRG, July 1992".

The principle of the coding used by this codec consists in splitting the spectrum of a source image into sub-bands, each band being coded separately. The codec firstly chooses the coding mode, intra or inter, and then quantizes the band itself for the intra mode, or the prediction error in respect of this band for the inter mode. The bands are next transmitted one after the other, in order, via a transmission channel after VLC coding, the abbreviation for the expression "Variable length Coding".

In inter prediction mode, the codec reconstructs two images of unlike resolutions from transmitted coefficients: a full resolution image in the HDTV loop and a quarter resolution image in the TV loop. The full resolution image is obtained through a bank of synthesis filters which uses all the frequency bands transmitted. The quarter resolution image uses just one quarter of the sub-bands transmitted.

These two decoded images are next stored in memory and used to provide the inter prediction for the following source image after estimation and compensation for motion between the preceding decoded image and the current source image. The two images are next realigned and split into sub-bands: the TV loop provides one quarter of the sub-bands, corresponding to the low frequencies and the remainder of the sub-bands originate from the HDTV loop.

In this type of codec, the compatible quarter resolution image is realigned for the inter prediction by using the vectors estimated between the full resolution images, after scaling. However, the corresponding realignent, although it may be well suited to the full resolution level, is not necessarily so suited to the quarter resolution level.

Moreover, all the motion vectors transmitted in respect of the full resolution image have also to be decoded by the compatible decoder, this considerably increases the bit rate corresponding to the compatible part for low bit rates.

SUMMARY OF THE INVENTION

The purpose of the invention is to obviate the aforesaid drawbacks.

To this end, the subject of the invention is a coder/decoder for sub-band compatible coding of television images of the type including a main coding circuit and coding loops of specified format, which are coupled to a hierarchical estimator of motion between two consecutive source images, a preceding image and a current image, characterized in that it includes means for constructing, from the preceding decoded image, and from the current source image, respectively two pyramids of images of unlike resolution each containing the same specified number of images ordered identically according to their resolution, in which each image corresponds to a level of resolution which is half as large in the horizontal and vertical directions of the image as the preceding level of resolution, and in that each pyramid is applied respectively to a first and a second serial input of the hierarchical motion estimator which outputs a motion vector, the magnitude of which is proportional to the estimated motion between the two pyramids.

The invention has the advantage that it makes it possible, on the one hand, to rely upon a known structure of a double-loop codec for generating a multiresolution pyramid, and makes it possible, on the other hand, to improve the performance of the codec in regard to image quality at a given bit rate, especially at the level of the compatible part.

BRIEF DESCRIPTION OF THE DRAWINGS

Other characteristics and advantages of the invention will emerge in the description which follows given in conjunction with the appended drawings which represent.

DETAILED DESCRIPTION OF THE PREFERRED EMBODIMENTS

Figure 1:
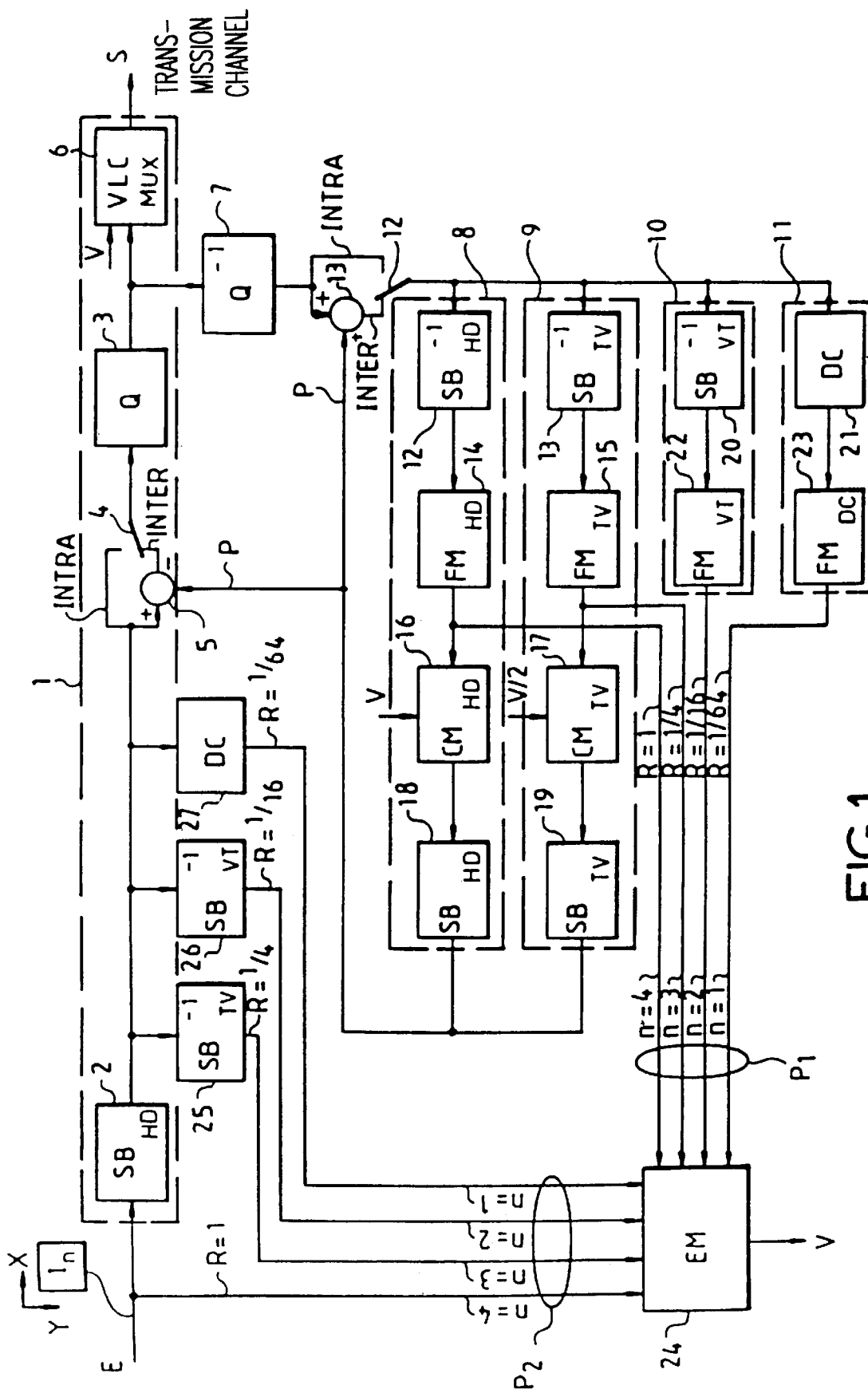
FIG. 1, an embodiment of a coder/decoder according to the invention.

An embodiment of a coder/decoder, or codec, with four levels of resolution according to the invention, incorporating a multiresolution hierarchical motion estimator, is represented by FIG. 1.

This embodiment uses the principle of sub-band splitting, developed in a publication entitled "Perfect Reconstruction modulated Filter Banks" by J. Mau, published in "ICASSP, March 1992, San Francisco".

An image can be split into sub-bands with the aid of a parallel structure based on the use of two-dimensional separable filter banks. Such banks include analysis filters and synthesis filters. The banks of analysis filters split an image into a specified number N of bands along the horizontal X and vertical Y directions of the image, defining a number M of rows and M of columns respectively. The separable aspect of the filters enables the rows and columns of the image to be processed independently. For a partition of an image into sub-bands M×M, the bank of analysis filters is one-dimensional and splits the rows and then the columns of the image into M sub-bands in succession. The sub-bands are sub-sampled by the number of bands M in each direction X and Y.

In the same way, the image is reconstructed with the aid of a bank including a number M of one-dimensional synthesis filters corresponding to the number M of sub-bands, and of an interpolation by a specified factor of the number of sub-bands M. The analysis and synthesis filters are computed by modulating the same linear-phase low-pass prototype filter; the modulating phases on analysis and on synthesis are opposites so as to eliminate spectral aliasing during reconstruction of the image.

Starting from a splitting of the full resolution image into M×M sub-bands, the codec according to the invention reconstructs a quarter resolution sub-image, provided that M is even. To do this, the codec selects the M/2×M/2 sub-bands which correspond to this level of resolution, the sub-bands corresponding to the low frequencies, and computes a synthesis bank deduced simply from the full resolution synthesis bank. The bank of M/2 synthesis filters is obtained by modulating a version, sub-sampled by two, of the original prototype filter for the partition into M sub-bands. If M is a power of 2, the process is iterated and generates sixteenth resolution sub-images, etc. down to the use of the 1×1 synthesis bank.

The embodiment of a codec according to the invention includes a main coding circuit 1 demarcated by a discontinuous closed line. This circuit makes it possible to send over a transmission channel either, in intra mode, a coded current source image $I_n$, or in inter mode, a coded error signal resulting from the difference between the current source image $I_n$ and an image arising from a prediction made on the basis of the preceding decoded image $I_{n-1}$.

The main circuit includes, from the input E to the output S, a first bank of high definition analysis filters, or HD analysis bank 2, receiving the current source image $I_n$ on its input and delivering the same full resolution image split into 64 bands on its output, 8 bands in the horizontal X direction and the direction Y of the image. The output of the HD analysis bank 2 is either coupled directly to the input of a quantizing circuit, or quantizer 3, by way of a switch 4 in the "intra mode" position selected by the codec, or coupled to a first operand input of a subtraction operator, or subtracter 5, whose output is coupled to the input of the quantizer 3 by way of the switch 4 in the "inter mode" position selected by the codec.

The output of the quantizer 3 which delivers either the HD image split and quantized, in intra mode, or the quantized error signal, in inter mode, is coupled on the one hand with a first input of a variable-length coding device, or VLC 6, incorporating a multiplexer, MUX, and the output of which is coupled to the transmission channel, and coupled on the other hand to the input of a dequantizing circuit, or dequantizer 7, the output of which is either coupled directly to the input of four coding loops 8 to 11, represented respectively inside a discontinuous closed line, by way of a second switch 12 in the "intra mode" position selected by the codec, or coupled to a first operand input of an addition operator, or adder 13, the output of which is coupled to the input of the four coding loops 8 to 11 referred to respectively by their HD, TV, VT and DC format signifying respectively, high definition format, television format, videotelephone format and "direct current" format signifying that the mean of the signal is zero, by way of the second switch 12 in the "inter" mode position selected by the codec.

Each loop 8 to 11 delivers an image reconstructed from the preceding decoded image $I_{n-1}$ and constructs respectively a full resolution image with the HD format, a ¼ resolution image with the TV format, a ¹/₁₆ resolution image with the VT format, and a ¹/₆₄ resolution image with the DC format. The first and the second loop 8 and 9 correspond respectively to an HD prediction loop and a TV prediction loop.

The HD prediction loop 8 and the TV prediction loop 9 respectively include, from the input to the output, a bank of synthesis filters, or synthesis bank, 12 and 13, for reconstructing, from the full resolution image split into sub-bands, an HD format full resolution R=1 image, and a TV format ¼ resolution R=¼ image.

The synthesis banks 12 and 13 are coupled respectively to the input of an image memory 14 and 15 allowing storage of the preceding HD and TV format images. The output of each image memory 14 and 15 is coupled respectively to a first input of a motion compensation device 16 and 17 enabling the HD and TV format images to be realigned on the basis of an estimation of motion performed between the current source image $I_n$ and the preceding decoded image $I_{n-1}$ via a command, in the form of a motion vector V, arriving on a second input of the motion compensation device 16 and 17. The total magnitude of the motion vector V is applied to the motion compensation device 16 of the HD loop, and half of this magnitude to the motion compensation device 17 of the TV loop, owing to the resolution of the TV loop which represents half the resolution of the HD loop in the two directions X and Y of the image. The outputs of these devices 16 and 17 are coupled respectively to the input of an analysis bank 18 and 19. The two realigned ED and TV format images are then split into sub-bands and serve as prediction for the following source image $I_n$.

The respective outputs of the analysis banks 18 and 19 are coupled together and coupled on the one hand to the second operand input of the subtracter 5 and on the other hand to the second operand input of the adder 13. The third and the fourth loop 10 and 11 correspond respectively to a loop with the VT and DC format and respectively include a synthesis bank 20 and 21. The output of each synthesis bank 20 and 21 is coupled respectively to the input of an image memory 22 and 23.

The outputs of the image memories 14, 15, 22 and 23 relating to the four loops 8, 9, 10 and 11 are coupled respectively to a first series of four ordered inputs of a hierarchical multiresolution motion estimator 24.

The outputs of the four loops 8, 9, 10 and 11 generate a first multiresolution pyramid $P_1$ where each image reconstructed in each of the loops 8, 9, 10 and 11 corresponds to one of the four levels n=1 to 4 of the pyramid $P_1$. The first level n=1 corresponds to the full resolution R=1 image with the HD format, the second level n=2 to the ¼ resolution R=¼ image with the TV format, the third level n=3 to the ¹/₁₆ resolution R=¹/₁₆ image with the VT format and the fourth level n=4 to the ¹/₆₄ resolution R=¹/₆₄ image with the DC format.

The estimator 24 receives a second multiresolution pyramid $P_2$ on a second series of four ordered inputs like the first series of the four preceding inputs.

The first input receives the full resolution current source image $I_n$ before sub-band splitting by the HD analysis bank 2 of the main coding circuit 1. The three succeeding inputs respectively receive, in order, an image reconstructed by a TV synthesis bank 25, a VT synthesis bank 26 and a DC synthesis bank 27 from the current source image $I_n$ split into M×M sub-bands by the analysis bank 2 of the main coding circuit 1 and injected onto each of their input.

Hierarchical motion estimation is next carried out by the estimator 24 between the current source image $I_n$ and a previously coded source image $I_{n-1}$. The first pyramid $P_1$ corresponding to this last decoded image $I_{n-1}$ already contains the decoded full resolution image present in the ED loop 8, the ¼ resolution image present in the TV loop 9 and the DC image obtained directly from the coefficients of the synthesis filter 21 of the DC loop 11. The codec reconstructs only the ¹/₁₆ resolution image on the basis of the synthesis bank 20 of the VT loop 10.

The output of the estimator 24 generating a motion vector V resulting from the motion estimation carried out on the basis of the two multiresolution pyramids $P_1$ and $P_2$ is coupled on the one hand to the second input of the image memory 16 of the first HD prediction loop 8 and on the other hand with a second input of the VLC of the main coding circuit 1. The same vector V, the magnitude of which is however divided by two, is also coupled to the second input of the image memory 17 of the second TV prediction loop 9.

The use of a multiresolution hierarchical estimator in a codec according to the invention does not require modifications of the structure of the estimation algorithm: the motion vectors V used for the compatible images with the TV format are the vectors of the full resolution images, HD format, rescaled. The field of vectors V ensures realignment both for the HD full resolution images and for the TV compatible images after scaling the vectors V. The various levels n=1 to n=4 of the first pyramid $P_1$ are in fact reconstructed from compatible images. In particular, the vectors V estimated at the last level n=4 are initialized with the aid of the vectors computed at the preceding level n=3, thus ensuring the best realignment for the TV compatible image. The field of the full resolution motion vector V, when it is rescaled for the realignment of the TV compatible image, therefore has every chance of resembling the true field such as it was estimated at the penultimate level n=3 of the first pyramid $P_1$.

An example of an estimation process is described briefly below: a source image is split into a specified number of blocks where each block is defined by the intersection of a row and its respective column and the size of which remains identical for all the levels of resolution. In this example, the motion estimation should culminate, for the full resolution image, in one motion vector per 16×16 block for a progressive format or 16×8 block for an interlaced format. The search starts at the lowest level of resolution.

The estimator includes one temporal predictor per block for initializing the search; the value of this predictor is that of the vector which corresponds to the same block and to the same level of resolution during the preceding estimation. At the start of the sequence, the temporal predictors are set to zero. The estimator next calculates the displaced inter-image difference, known by the abbreviation DFD, corresponding to the temporal prediction together with that corresponding to a zero displacement. The vector with the minimum DFD is picked. This vector is next refined with the aid of a search window of size ±x in the horizontal direction X and ±y in the vertical direction Y, and centered on the tip of the vector. The corrected vector which produces the smallest DFD is picked and is used to initialize the search at the next level of resolution. This technique is developed notably by P. Anandan in an article entitled "Computing dense displacement fields with confidence measures in scenes containing occlusions", published in "SPIE Vol. 521 Intelligent Robots and Computer Vision, 1986".

For two successive levels n−1 and n, each block of the higher level n has available four predictors: one temporal predictor and three spatial predictors originating from the preceding estimation carried out at the lower level n−1. To each block of the lower level n−1 there correspond four blocks of the upper level n. The vector allocated to a block of the lower level n−1 is propagated over each of the four blocks of the upper level n after scaling the vector. An apportionment of the three spatial predictors is determined for each block of the upper level n.

Figure 2:
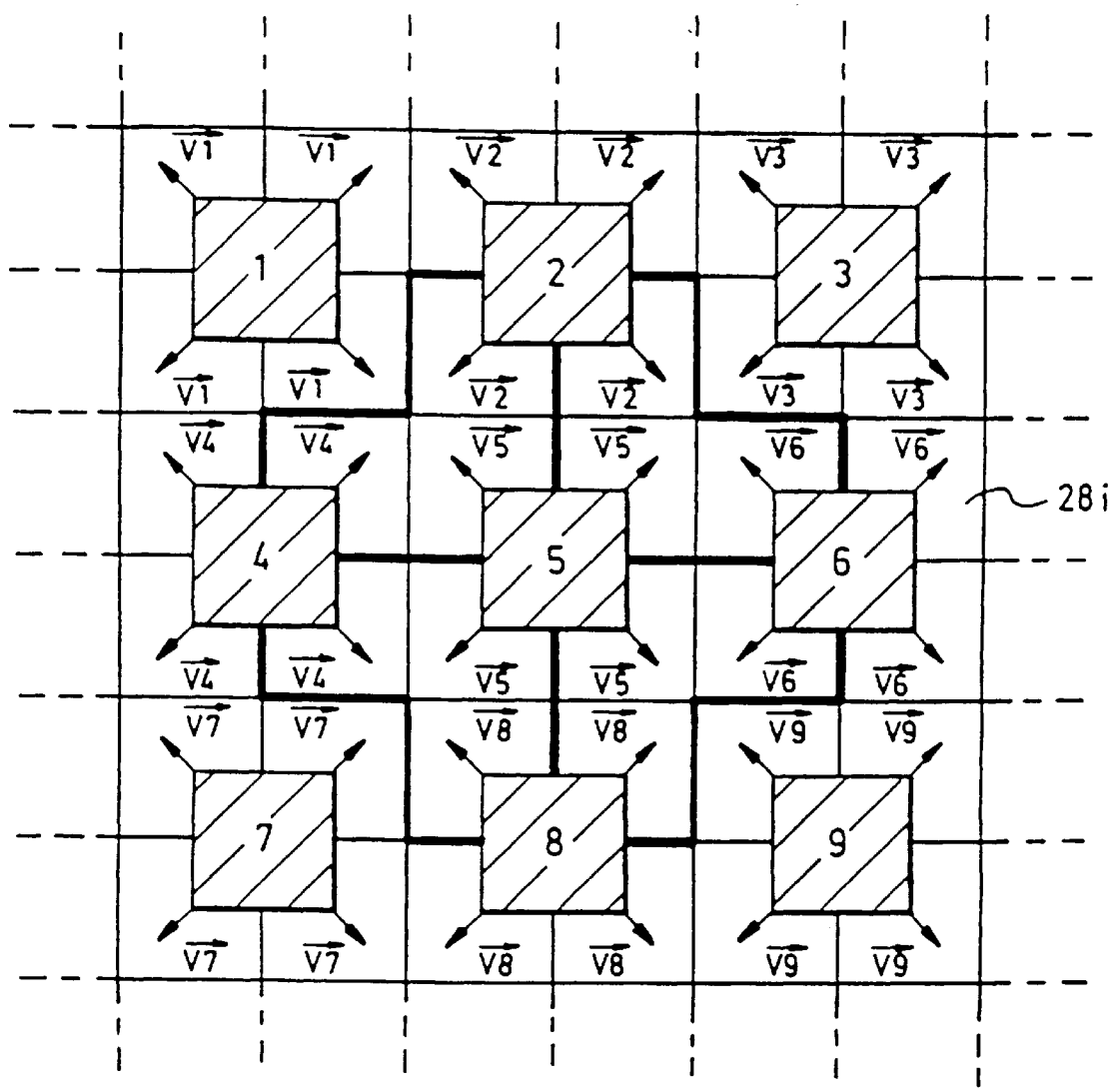
FIG. 2, a two-dimensional representation of one part of an image pyramid illustrating one choice of spatial predictors via a hierarchical motion estimator used by the coder/decoder according to the invention.

In the example of FIG. 2, nine blocks numbered from 1 to 9 of the lower level n=1 are represented hatched. To each block 1 to 9 there correspond four blocks of the upper level n=2, designated respectively by the same vector $\vec{V}_1$ to $\vec{V}_9$; a top left block, a top right block, a bottom left block and a bottom right block.

To the block 5 there correspond four blocks designated respectively by a vector $\vec{V}_5$, the block 5 being centered on the four blocks of the upper level n=2. Three spatial predictors are allocated to each of the four blocks designated by the vector $\vec{V}_5$. A first spatial predictor corresponds respectively to one of the four blocks tagged by the vector $\vec{V}_5$ of upper level n=2, and the other two predictors correspond respectively to the two blocks adjacent to the first predictor. The set of the 4×3 predictors forms a cross at the upper level n=2. The remainder of the search proceeds in the same way for the other blocks of the lower level n=1 and the same operation is performed for the succeeding higher levels n=3 and 4; however, for the full resolution level corresponding to the level n=4, the estimator no longer uses the temporal predictor but uses only the three spatial predictors to initialize the search so as to minimize the complexity of embodiment. One integer vector per 16×16 or 16×8 block is thus obtained at the four levels n=1 to n=4.

To obtain sub-pixel accuracy, it is possible to use bilinear interpolation or the like and to test the corresponding positions around the integer vector found previously.

The maximum integer magnitude of the vectors estimated with the aid of this hierarchical estimator is:

for the level n=1 $|V_{1x}|+x$ $|V_{1y}|+y$,
for the level n=2 $2|V_{1x}|+3x$ $2|V_{1y}|+3y$,
for the level n=2 $4|V_{1x}|+7x$ $4|V_{1y}|+7y$, and
for the level n=4 $8|V_{1x}|+15\times8|V_{1y}|+15y$, where $|V_{1x}|$ and $|V_{1y}|$ represent respectively the norm of the vector $V_1$ in the direction X and the norm of the vector $V_1$ in the direction Y.

Thus, with a window with an excursion of ±3 pixels horizontally and vertically, in the progressive case, the estimator can estimate vectors whose magnitude may reach ±45 pixels in each direction. In fact, the use of the temporal predictor at the first level of the pyramid permits higher magnitude vector estimation; all the same, the maximum magnitude which may be estimated must be limited at all levels of the pyramid so as to reduce the risk of the estimator diverging The codec according to the invention can be applied to the coding of motion vector fields using tree structures of "quadtree" type, for example.

In this application, the vectors used for the compatible part should be transmitted directly via the tree structure. This application is beneficial from the viewpoint of reducing the cost of coding the total field relative to conventional differential coding, but another even more beneficial advantage lies in the fact that the compatible decoder is not compelled to decode all the motion information but merely that part of the tree spanning from the root to the desired level of resolution.

We claim:

1. A method of coding a video signal comprising the steps of:

decomposing a video signal into sub-band signals by applying said video signal to a first bank of analysis filters;

generating a first pyramid of current images by applying said sub-band signals to a first plurality of banks of synthesis filters, wherein said first pyramid includes a plurality of images with different resolutions;

coding said sub-band signals in one of an intra-mode and an inter-mode utilizing motion compensated sub-band signals to obtain coded sub-band signals;

decoding said coded sub-band signals based on one of the intra-mode and the inter-mode used in the coding step, wherein decoding using inter-mode utilizes motion compensated sub-band signals to obtain decoded sub-band signals;

applying the decoded sub-band signals to a second plurality of banks of synthesis filters to obtain images with different resolutions corresponding to the different resolutions of the plurality of images which make up the first pyramid;

storing said plurality of images to obtain previous images including a second pyramid of images having the same resolution as the plurality of images making up the first pyramid;

estimating motion between a current image of highest resolution and a previous image of highest resolution by performing a hierarchical motion estimation utilizing the plurality of images of the first and second pyramids;

motion compensating at least one of the stored images to obtain a motion compensated image; and filtering the at least one motion compensated image using a second bank of analysis filters to obtain motion compensated sub-band signals.

2. The method according to claim 1, wherein the step of motion compensating comprises motion compensating two stored images having different resolutions, a lower resolution image and a higher resolution image;

the step of filtering comprises filtering the at least one motion compensated image through said second bank of analysis filters and through a third bank of analysis filters to obtain two groups of motion compensated sub-bands signals;

the method further comprises the step of selecting from two groups (1) sub-band signals from the lower resolution image as lowest frequencies of said motion compensated sub-band signals and (2) sub-band signals from the higher resolution image as highest frequencies of said motion compensated sub-band signals.

3. A sub-band coder for video signal comprising:

a first bank of analysis filters receiving at a first input a video signal and decomposing the video signal into plural sub-band signals, a first plurality of banks of synthesis filters receiving at second inputs at least one of the plural sub-band signals and generating at plural filter outputs a first plurality of images, each of the plural outputs providing an image with a different resolution, first coding means including third and fourth inputs and a coding output, the third input receiving the plural sub-band signals and coding the plural sub-band signals in one of an intra-mode and an inter-mode, the fourth input receiving motion compensated sub-band signals, the coding output providing coded sub-band signals, decoding means including fifth and sixth inputs, the fifth input receiving the coded sub-band signals and the sixth input receiving motion compensated sub-band signals to provide plural decoded sub-band signals, a second plurality of banks of synthesis filters receiving at seventh inputs at least one of the plural decoded sub-band signals and generating at plural reconstruction outputs a pyramid of a plurality of images with resolutions corresponding to the resolutions of the first plurality of images, each of the reconstruction outputs providing a reconstructed image signal with a different resolution, a plurality of frame memories including (1) frame memory inputs coupled to the plural reconstruction outputs for storing the reconstructed image signals and (2) frame memory outputs for outputting previous image signals, each of the previous image signals being stored in a corresponding one of the plurality of frame memories;

hierarchical motion estimation means receiving (1) the first plurality of images from the first plurality of bank of synthesis filters and (2) a second plurality of images from the plurality of frame memories, and outputting a motion vector;

at least one motion compensation device outputting (1) a motion compensated image signal based on the motion vector output from the hierarchical motion estimation means and (2) at least one of the previous image signals from the frame memory;

at least one second bank of analysis filters coupled to said at least one motion compensation device and outputting motion compensated sub-band signals to said coding and decoding means based on said motion compensated image signal; and second coding means receiving said coded sub-band signals from said first coding means and outputting a coded video signal as an output of the coder.

4. The coder according to claim 3, wherein said at least one motion compensation device is coupled to a corresponding one of the plurality of frame memories storing an image having a highest resolution and wherein another motion compensation device is coupled to a one of the plurality of frame memories storing an image having a second highest resolution;

the coder farther comprising a third bank of analysis filters coupled to another motion compensation device to provide motion compensated sub-band signals, the motion compensated sub-band signals feeding said first coding means and said decoding means being obtained by selecting, for the lowest frequencies, the sub-band signals from the lower resolution images and, for the highest frequencies, sub-band signals from the higher resolution images.

5. The coder according to claim 4, wherein resolutions of the motion compensated sub-band signals are compatible with different television standards.

6. The coder according to claim 4, wherein motion vectors output by said hierarchical motion estimation means to said another motion compensation device and said at least one motion compensation device are calculated from the motion vector corresponding to a full resolution image.

7. The coder according to claim 3, wherein the hierarchical motion estimation means comprises an input receiving a highest resolution image of the pyramid of the plurality of images.

8. The coder according to claim 3, wherein said hierarchical motion estimation means further comprises a bilinear interpolation stage allowing sub-pixel accuracy corresponding to a resolution greater than an original resolution of the video signal.

9. The coder according to claim 3, wherein said first and second pluralities of images include images having videotelephone, television and high definition formats.

10. The coder according to claim 3, wherein the first coding means comprises:
    a subtractor to subtract said motion compensated sub-band signals from said sub-band signals to provide error signals,
    a switch to select, according to an energy criterion, said sub-band signals or error signals to provide selected signals, and
    a quantizer to quantize said selected signals and provide quantized selected signals,
wherein said decoding means comprises:
    a dequantizer to dequantize the quantized selected signals to give dequantized signals, and
    an adder to add said dequantized signals to said motion compensated sub-band signals.

11. The coder according to claim 3, wherein second of coding means comprises:
    a multiplexer with two inputs and one output,
    a first input receiving said coded sub-band signals,
    a second input receiving said motion vector to provide a multiplexed signal, and
    a variable length coder to code said multiplexed signal.

12. The coder according to claim 3, wherein the analysis and synthesis filters are computed by modulating a single linear-phase low-pass prototype filter, wherein modulating phases during analysis and during synthesis are opposites so as to eliminate spectral aliasing during reconstruction of images.

* * * * *